United States Patent [19]
Slade et al.

[11] Patent Number: 5,999,380
[45] Date of Patent: *Dec. 7, 1999

[54] SMOOTH TOPOGRAPHY HEAD SURFACE ON A HEAD WITH PATTERNED POLE

[75] Inventors: Steven B. Slade, New Hope; Daniel P. Burbank, Minneapolis, both of Minn.

[73] Assignee: Seagate Technology, Inc., Scotts Valley, Calif.

[ * ] Notice: This patent is subject to a terminal disclaimer.

[21] Appl. No.: 08/809,430

[22] PCT Filed: Jun. 3, 1996

[86] PCT No.: PCT/US96/08348

§ 371 Date: Apr. 4, 1997

§ 102(e) Date: Apr. 4, 1997

[87] PCT Pub. No.: WO96/41336

PCT Pub. Date: Dec. 19, 1996

Related U.S. Application Data

[63] Continuation-in-part of application No. 08/476,899, Jun. 7, 1995, Pat. No. 5,613,293
[60] Provisional application No. 60/015,142, Apr. 5, 1996.

[51] Int. Cl.$^6$ .................................................. G11B 5/187
[52] U.S. Cl. ........................................................ 360/122
[58] Field of Search ..................................... 360/122, 121, 360/123, 126, 127, 110, 119, 115; 29/603.12, 603.15, 603.18, 603.16, 603.14

[56] References Cited

U.S. PATENT DOCUMENTS

| | | | |
|---|---|---|---|
| 4,143,458 | 3/1979 | Gibson | 29/603.12 |
| 4,188,247 | 2/1980 | Ridgway | 156/154 |
| 4,295,173 | 10/1981 | Romankiw et al. | 360/125 |
| 4,732,600 | 3/1988 | Schiller | 29/603.12 X |
| 5,067,230 | 11/1991 | Meunier et al. | 360/122 |
| 5,089,923 | 2/1992 | Lehureau | 360/122 |
| 5,321,882 | 6/1994 | Zarouri et al. | 29/603.12 X |
| 5,402,295 | 3/1995 | Suzuki et al. | 360/122 |
| 5,613,293 | 3/1997 | Slade et al. | 29/603.12 |

FOREIGN PATENT DOCUMENTS

| | | | |
|---|---|---|---|
| 0340085 | 11/1989 | European Pat. Off. | 360/122 |
| 0 407 244 A1 | 1/1991 | European Pat. Off. . | |
| 0 517 137 A2 | 12/1992 | European Pat. Off. . | |
| 1530906 | 6/1968 | France . | |
| 58-218018 | 12/1983 | Japan | 360/122 |

OTHER PUBLICATIONS

PCT Search Report for PCT Application No. PCT/US96/08348, having an international filing date of Jun. 3, 1996. The present application is a national stage filing of this PCT Application.

Development of Technologies for 2–Gb/in$^2$ Areal Density Recording*, Masaki Futamoto and Fumio Kugiya, *Electronics and Communications in Japan*, Mar., 1993, pp. 94–103.

K. Fukuda et al., Off–Track Capability of a Pole Trimmed Thin Film Head, Journal of the Magnetics Society of Japan, vol. 18, Supplement, No. S1 (1994).

M. Yoshida et al., Edge Eliminated Head, IEEE Transactions on Magnetics, vol. 29, No. 6, Nov. 1993, pp. 3837–3839.

PCT First Written Opinion for PCT Application No. PCT/US96/08348, having an international filing date of Jun. 3, 1996. The present application is a national stage filing of this PCT Application.

*Primary Examiner*—Allen T. Cao
*Attorney, Agent, or Firm*—Kinney & Lange

[57] ABSTRACT

A thin-film head has patterned pole tips (68) and a smooth interface topography (70) which eliminates the accumulation of foreign material around the pole tips (68). The patterned pole tips (68) are formed by removing material to obtain a desired pole tip shape. Fill material is added and reduced to produce a smooth surface topography (70).

2 Claims, 13 Drawing Sheets

SMOOTH TOPOGRAPHY HEAD SURFACE ON A HEAD WITH PATTERNED POLE

This is a continuation-in-part of application Ser. No. 08/476,899, filed Jun. 7, 1995 U.S. Pat. No. 5,613,293. Matter not disclosed in the Ser. No. 08/476,899 application claims priority from U.S. provisional application Ser. No. 60/015,142 filed Apr. 5, 1996.

FIELD OF THE INVENTION

The present invention relates to the surface of a thin-film magnetic head serving as the interface between the head and a recording medium. More particularly, it relates to a thin-film head with a smooth topography interface surface which has patterned magnetic poles.

BACKGROUND OF THE INVENTION

In magnetic recording devices, thin-film magnetic heads retrieve ("read") and store ("write") information to magnetic media by magneto-resistively or inductively sensing the magnetization of and creating respectively, localized magnetic domains in the media. When reading information from a magnetic medium, a thin-film head's interface surface moves over the medium at a short distance from the medium so that magnetic flux from the localized domains enters permeable material pole tips in the interface surface. This flux extends over a selected permeable material path from the surface of the pole tips at the interface surface to an electromagnetic transducer which converts the magnetic flux in the path into an electric read current. The electric read current is used by the recording device in which the head is mounted to create an electric read signal.

Thin-film heads are usually constructed using material deposition and etching techniques similar to those used in monolithic integrated circuit construction. In production, large numbers of heads are constructed on a large substrate, usually a wafer, by material deposition and etching techniques which construct the thin-film heads by layers. The heads are built up in a direction parallel to the plane of the eventual interface surface which is perpendicular to the plane of the substrate surface. This means that the basis for the eventual interface surface is located within the wafer when the deposition and etching process on the wafer is finished.

To expose the surface of the pole tips after this process, the wafer is sliced into rows near the ends of the pole tips. For each thin-film head, this creates a working surface that includes the surfaces of the pole tips. In some methods, the individual thin-film heads are simply cut from these rows and placed, as is, into magnetic recording devices with the working surfaces serving as the interface surfaces. In such methods, the shape of the pole tips is determined by the wafer-level etching and deposition procedures.

However, in other methods, the ends of the pole tips near the working surface are reshaped after the thin-film heads are cut into rows. To reshape the pole tips, the rows of thin-film heads are rotated to place the working surfaces in a common plane. Portions of the working surfaces are then masked with a layer of photoresist using known photoresist technology. A removal agent, such as an etching substance or ion milling beam, is then directed towards the masked and unmasked portions of the working surfaces. The removal agent removes material from the unmasked portions without affecting the masked portions, creating a depression around the masked portions and reshaping the ends of the pole tips near the pole tip surfaces.

When the head is used in a magnetic recording device, the milled out depression around the patterned pole tips tends to accumulate foreign material. This foreign material often leads to device failures because of resulting mechanical damage to the pole tips. Prior approaches attempted to minimize this accumulation by opening channels in the pole tips to allow the foreign material to pass through the pole tips. This strategy has not been successful in removing all of the foreign material that accumulates in the depression and therefore has not eliminated the mechanical damage associated with the depressions.

SUMMARY OF THE INVENTION

The present invention is a thin-film head with patterned poles and a smooth interface surface topography. The poles are patterned after the wafer has been cut into rows by etching around a masked portion of the pole tips. The depression in the interface surface created by this etching is removed by depositing a fill material over the entire interface surface. This fill material is then selectively removed until the pole tips are once again exposed and the interface surface has a smooth topography.

In preferred embodiments, the pole tips are masked with a photoresist which bonds to the areas of the interface surface which are to remain intact through the etching process. After the etching or milling is finished, the photoresist is not removed. Instead, fill material is deposited directly over both the areas covered by the photoresist and the areas not covered by the photoresist.

The fill material on top of the photoresist is removed by either a purely mechanical process or the combination of a mechanical process and a heating process involving a laser beam. In the purely mechanical process, the fill material is repeatedly struck causing the photoresist to fracture from the interface surface. This fracturing causes the photoresist and the fill material covering the photoresist to break off from the interface surface. In the second method of removing the photoresist, a laser heats the photoresist indirectly by heating the fill material. The heat causes the photoresist to craze and the small cracks formed in the photoresist when it crazes reduce the strength of its bond to the interface surface. A low intensity mechanical process then fractures the photoresist from the pole tip surface causing the photoresist and the fill material covering it to fall away from the pole tips.

The fill material which does not cover the photoresist is reduced to the level of the shaped pole tips by lapping the fill material. The lapped material creates a smooth topography with the pole tip surfaces and thus removes the depressions around the pole tips which accumulate foreign material.

In other preferred embodiments, the mask used to etch the depressions is removed before adding the fill material and a new mask is applied to the surface using a different masking pattern. The second masking pattern exposes regions surrounding and encompassing the depressions created during the removal process. The fill material is then deposited on top of the exposed area and the photoresist layer. The fill is then selectively removed in one of the manners described above.

In this second preferred embodiment, the initial depression forming process can also be accomplished with ion beam rastering. Such rastering does not require a photoresist layer to create accurately shaped depressions.

Thus, the present invention creates a smooth topography interface surface with patterned poles. This smooth topography eliminates the problem of depressions in the interface surface which can accumulate foreign material. By solving

DETAILED DESCRIPTION OF THE PREFERRED EMBODIMENTS

Figure 1:
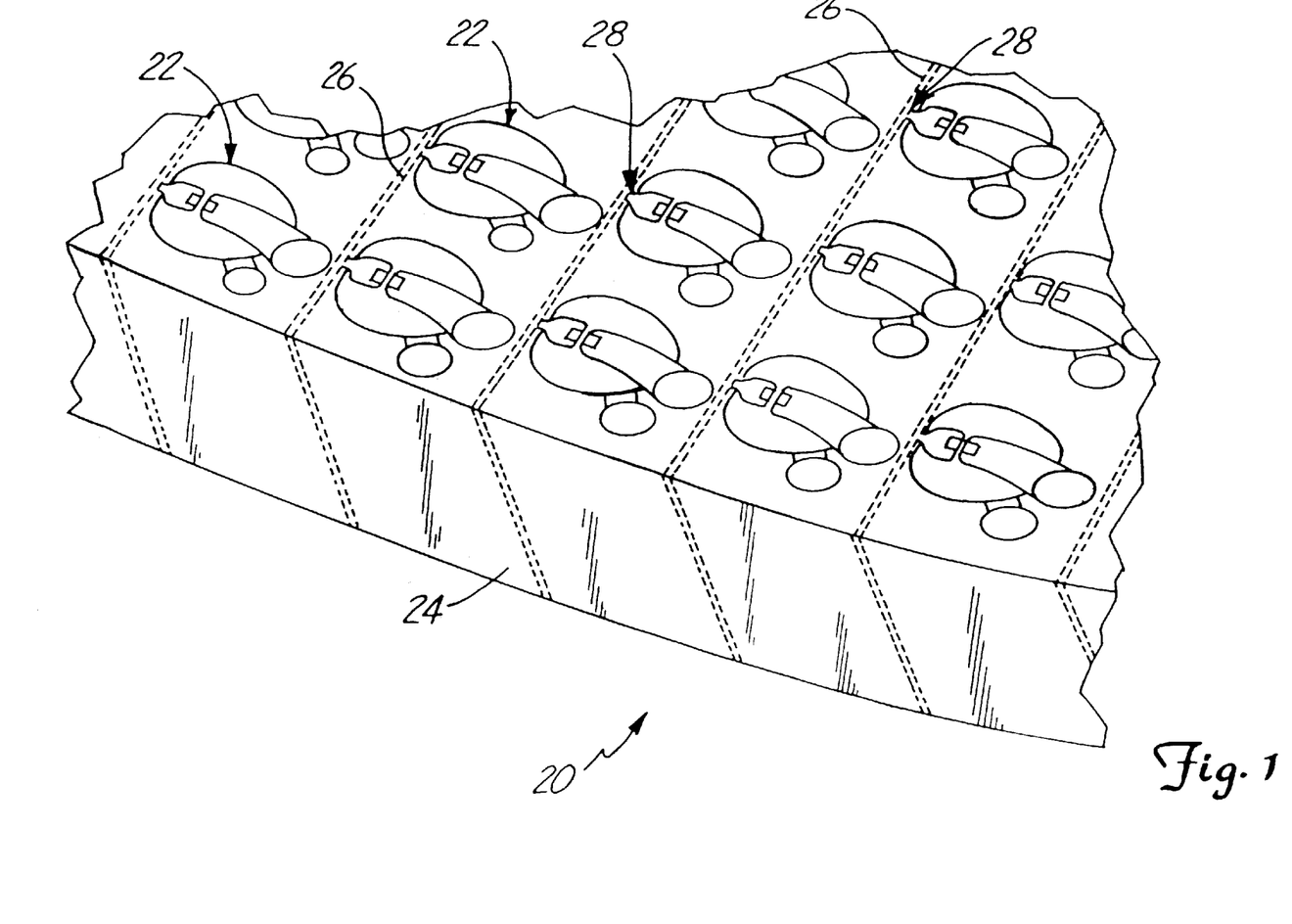
FIG. 1 is a portion of a wafer of partially constructed thin-film heads.

FIG. 1 is a portion of a wafer 20 containing a plurality of partially constructed inductive thin-film heads 22 formed through appropriate material depositions and etchings on a substrate 24 in a well known manner. To avoid obscuring the view of the remainder of the heads, FIG. 1 does not show a final insulation layer which lies over the top of thin-film heads 22. Thin-film heads 22 are constructed in rows and are cut from wafer 20 along cut lines 26 which intersect top pole tips 28 and bottom pole tips 30 (not shown).

Figure 2:
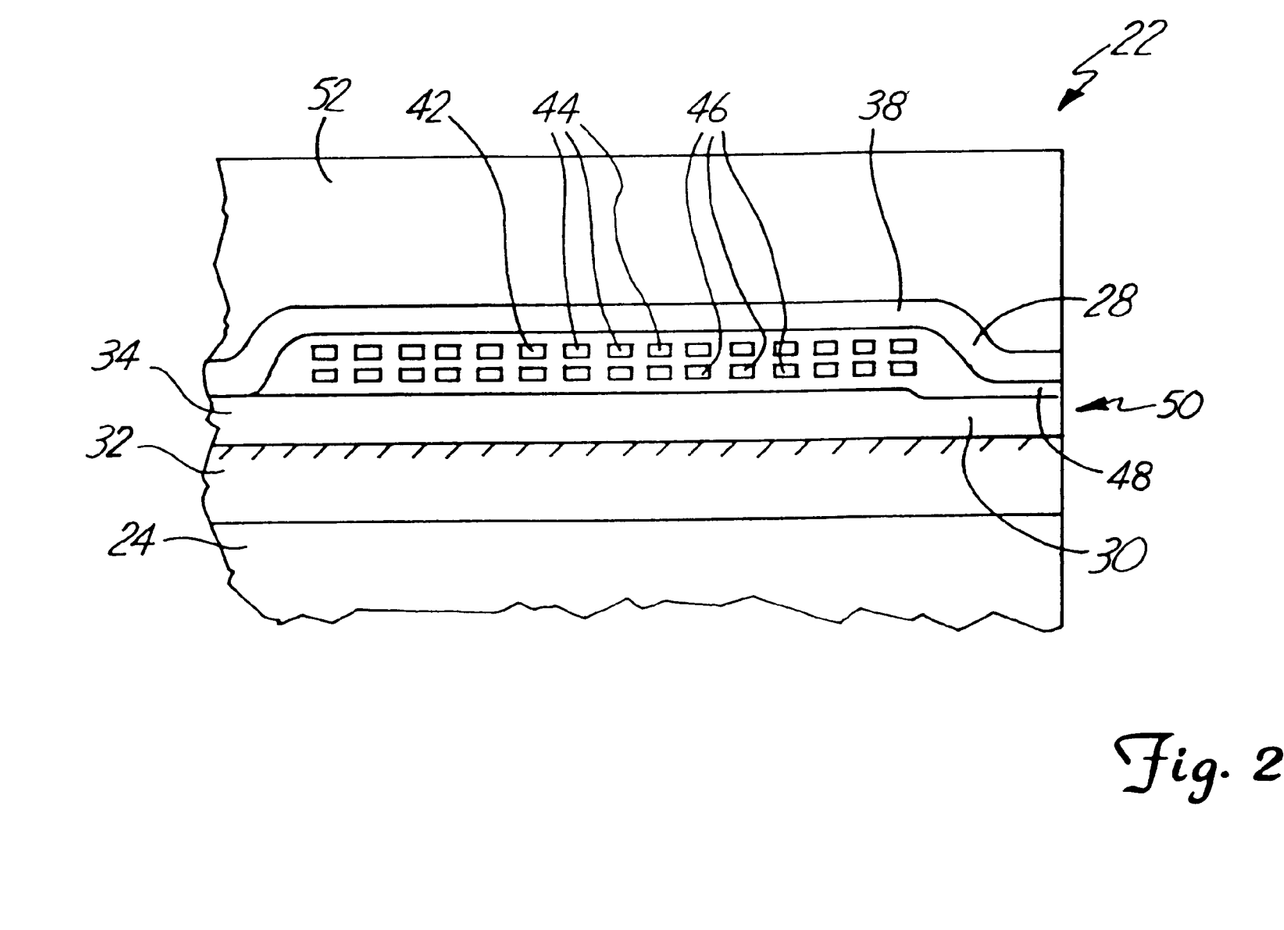
FIG. 2 is a cross-sectional side view of an inductive partially constructed thin-film head.

FIG. 2 is a cross-sectional side view of an inductive thin-film head 22 broken away from wafer 20. Working surface 50 shown on the right side of thin-film inductive head 22, is the surface produced by cut lines 26 of FIG. 1. Thin-film head 22 is constructed in wafer 20 by depositing and etching layers of material onto substrate 24. In general, a bottom insulating layer 32 of nonmagnetic material such as $Al_2O_3$ is first deposited on substrate 24. A bottom core leg 34 forming a bottom pole tip 30 near working surface 50 is deposited on top of bottom insulating layer 32. A top core leg 38 is formed above bottom core leg 34 and forms top pole tip 28 near working surface 50. The two core legs are typically constructed out of a nickel-iron alloy chosen for its magnetic properties. Between top core leg 38 and bottom core leg 34 is an insulating material 42 which houses conductive coils 44 and 46. Top pole tip 28 and bottom pole tip 30 form a gap 48 between them which is typically filled with a nonmagnetic material such as $Al_2O_3$. Above top core leg 38 is top insulating layer 52 which is also preferably $Al_2O_3$. Cut line 26 cuts through top insulating layer 52, top pole tip 28, gap 48, bottom pole tip 30 and bottom insulating layer 32 to form working surface 50 which is perpendicular to the plane of substrate 24.

In a magnetic recording device, working surface 50 is placed proximate to a magnetic media containing localized magnetic domains. As top pole tip 28 and bottom pole tip 30 encounter these local domains, magnetic flux extends from the domains through top core leg 38 and bottom core leg 34. In an inductive head, such as the one shown in FIG. 2, the changing magnetic flux induces current to flow through conductive coils 44 and 46. The direction of the current flow is indicative of the direction of the magnetic fields of the localized domains. Thus, the current through conductive coils 44 and 46 represents the magnetic signal stored as the magnetization of the magnetic medium's local domains. Although an inductive head is shown in FIG. 2, those skilled in the art will recognize that the smooth topography interface surface with patterned poles described below may be used with other types of heads including magneto-resistive heads.

Figure 3:
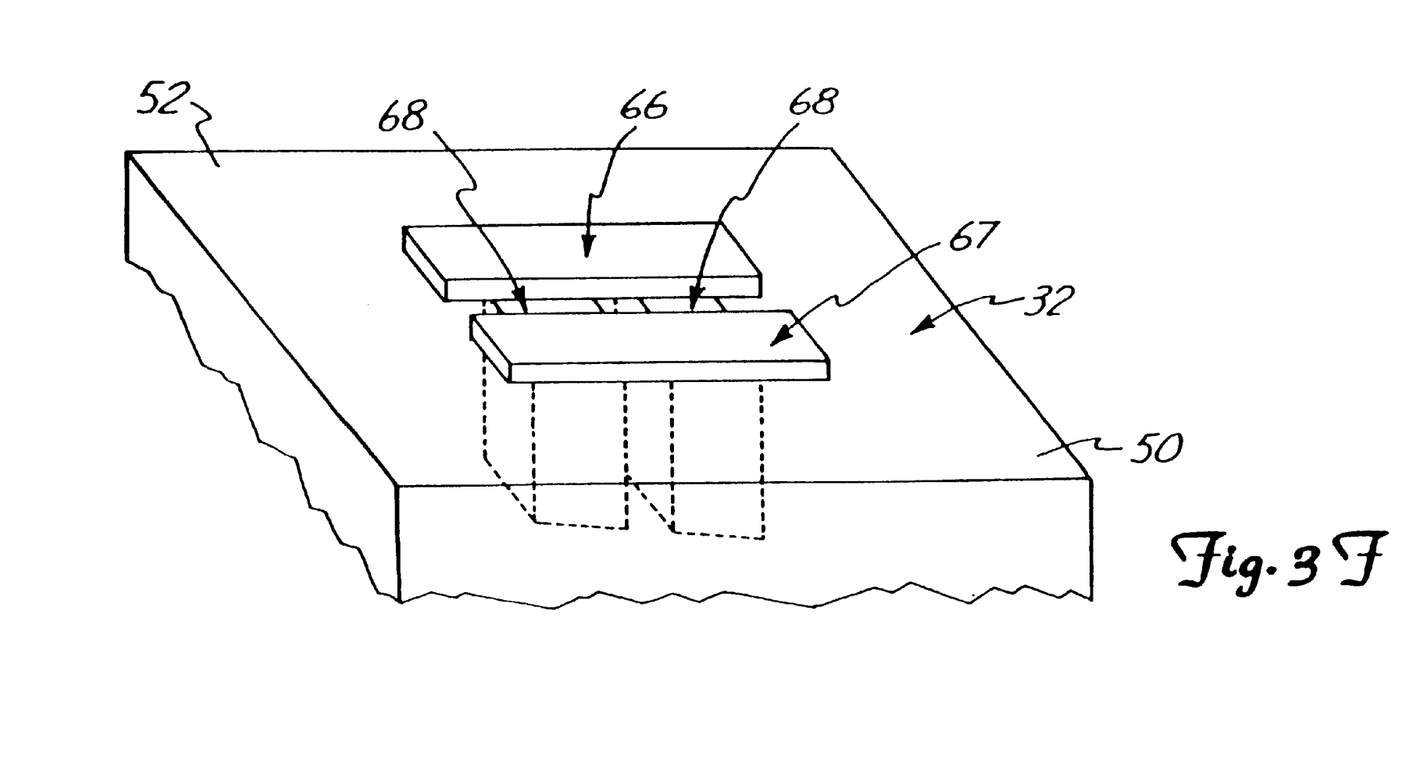
FIG. 3A is an isometric view of the working surface of a partially constructed thin-film head after being cut from the wafer of FIG. 1.
FIG. 3B is an isometric view of the partially constructed thin-film head of FIG. 3A with a film of photoresist applied to the working surface.
FIG. 3C is an isometric view of the partially constructed thin-film head with the unmasked portions of the photoresist removed.
FIG. 3D is an isometric view of the partially constructed thin-film head after unmasked material has been removed.
FIG. 3E is an isometric view of the partially constructed thin-film head after fill material has been added to the depression.
FIG. 3F is an isometric view of the partially constructed thin-film head after the photoresist of the masked portions has been removed.
FIG. 3G is an isometric view of the thin-film head after the fill material has been lapped so that it is level with the shaped pole tips.
Figure 3A:
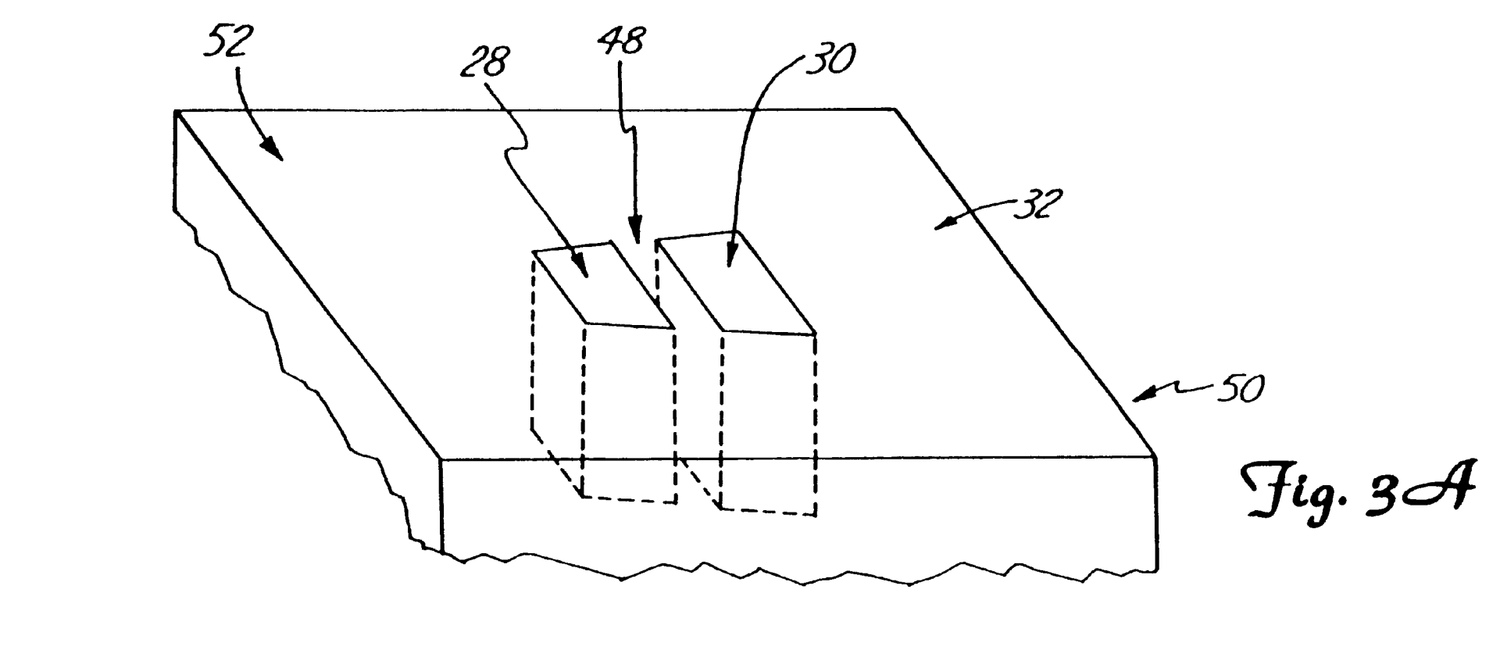

FIG. 3A is an isometric view of working surface 50 just after partially constructed thin-film head 22 has been cut from wafer 20 along cut line 26 of FIG. 1. Portions of bottom pole tip 30 and top pole tip 28 below working surface 50 are shown in dashed line form while the cross-sectional surfaces of the pole tips at working surface 50 are shown in solid line form. Pole tips 28 and 30 have a cross-sectional trapezoidal shape resulting from the material depositions and etchings performed to construct thin-film head 22 on top of substrate 24. Bottom insulating layer 32, gap 48 and top insulating layer 52 are typically constructed of the same nonmagnetic material. Together, they surround pole tips 28 and 30 at working surface 50 to form an integral unit.

After cutting thin-film heads 22 along cut line 26 in wafer 20, the rows of thin-film heads are broken off wafer 20 and rotated to substantially place all of the working surfaces 50 of all the rows in a common plane. The rotated rows are then composed into a single unit by means of an adhesive which allows further deposition and etching techniques to be performed in a batch process at or near working surfaces 50 to reshape the ends of top pole tip 28 and bottom pole tip 30 near working surfaces 50. As discussed below, after the ends of these pole tips are reshaped, an interface surface is created which has a smooth topography.

Figure 3B:
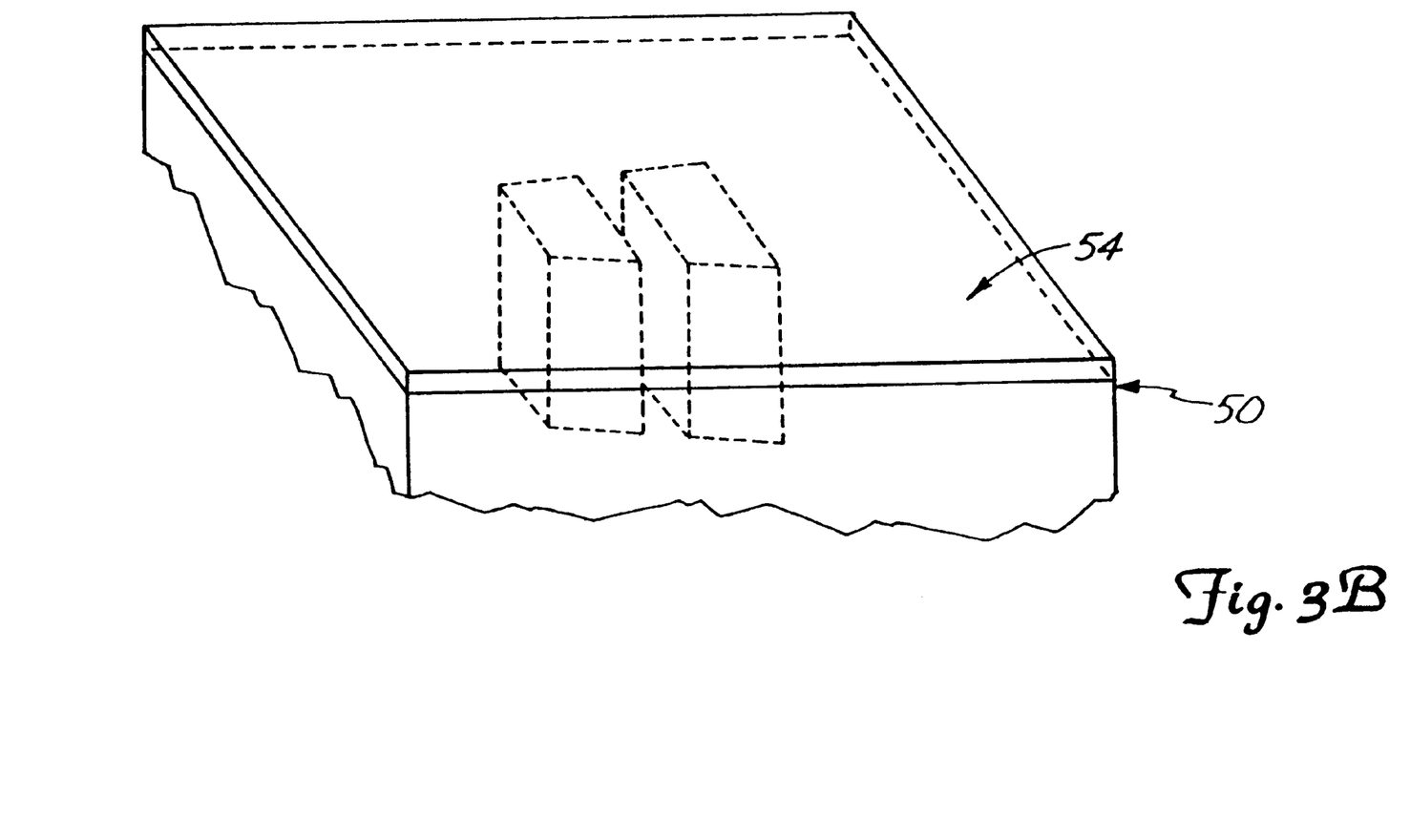
Figure 3C:
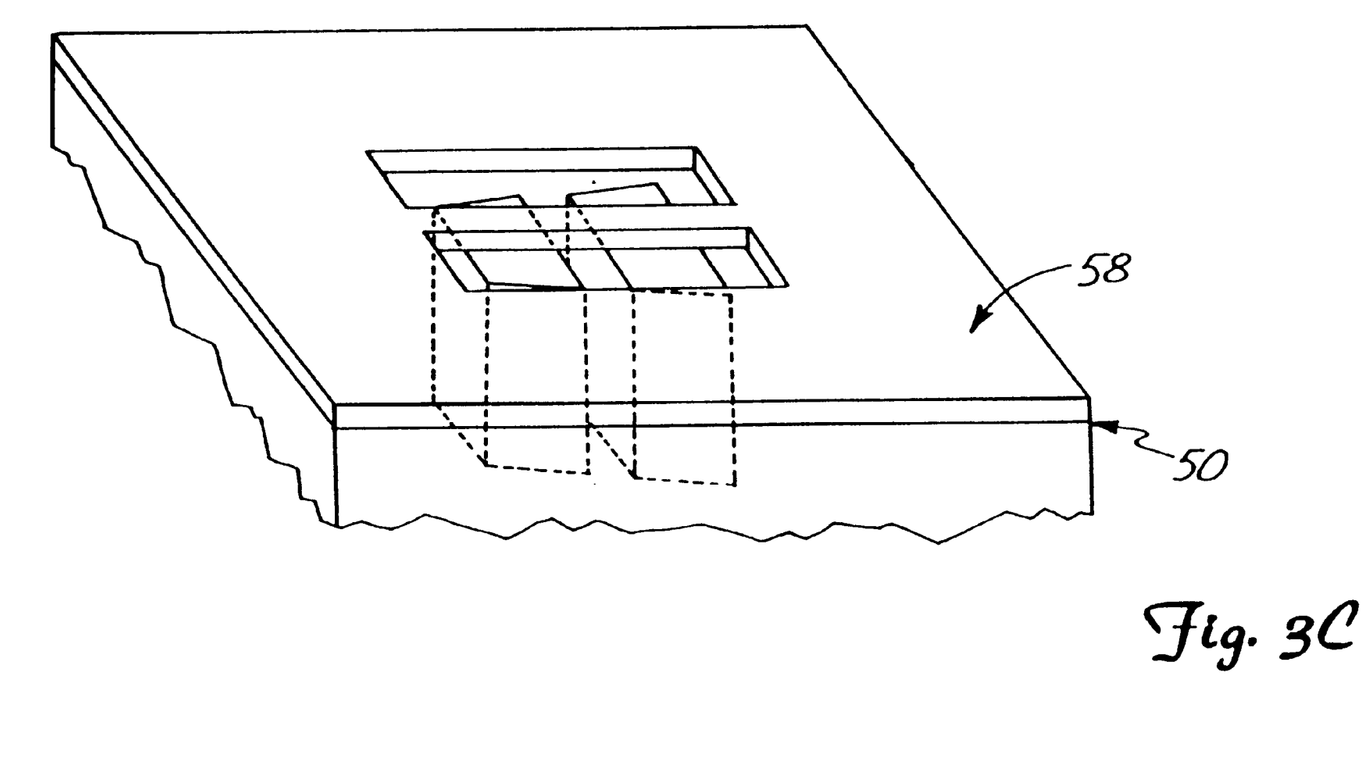

To begin the pole tip reshaping process, a thin film of photoresist 54 is deposited over the entirety of working surface 50 in a well known manner, as shown in FIG. 3B. Photoresist 54 can be one of many well known materials sensitive to electromagnetic radiation of certain wavelengths whose etching characteristics change when exposed to such radiation. Photoresist 54 is exposed to a pattern of such radiation by passing the radiation through a photomask which spatially filters the radiation allowing radiation to impinge only certain areas of photoresist 54. Those selected portions of photoresist 54 impinged upon by the radiation are altered with respect to those portions which are not impinged upon. This alteration results in areas on working surface 50 where photoresist 54 is tightly bound to the surface and areas where photoresist 54 is lightly bound to the surface. Additional well known processing steps remove the lightly bound resist and harden the tightly bound resist, forming a pattern of hardened resist. Such a pattern is shown in FIG. 3C where a photoresist pole tip mask 58 is the only portion of photoresist 54 left after the photoresist is developed.

Figure 3D:
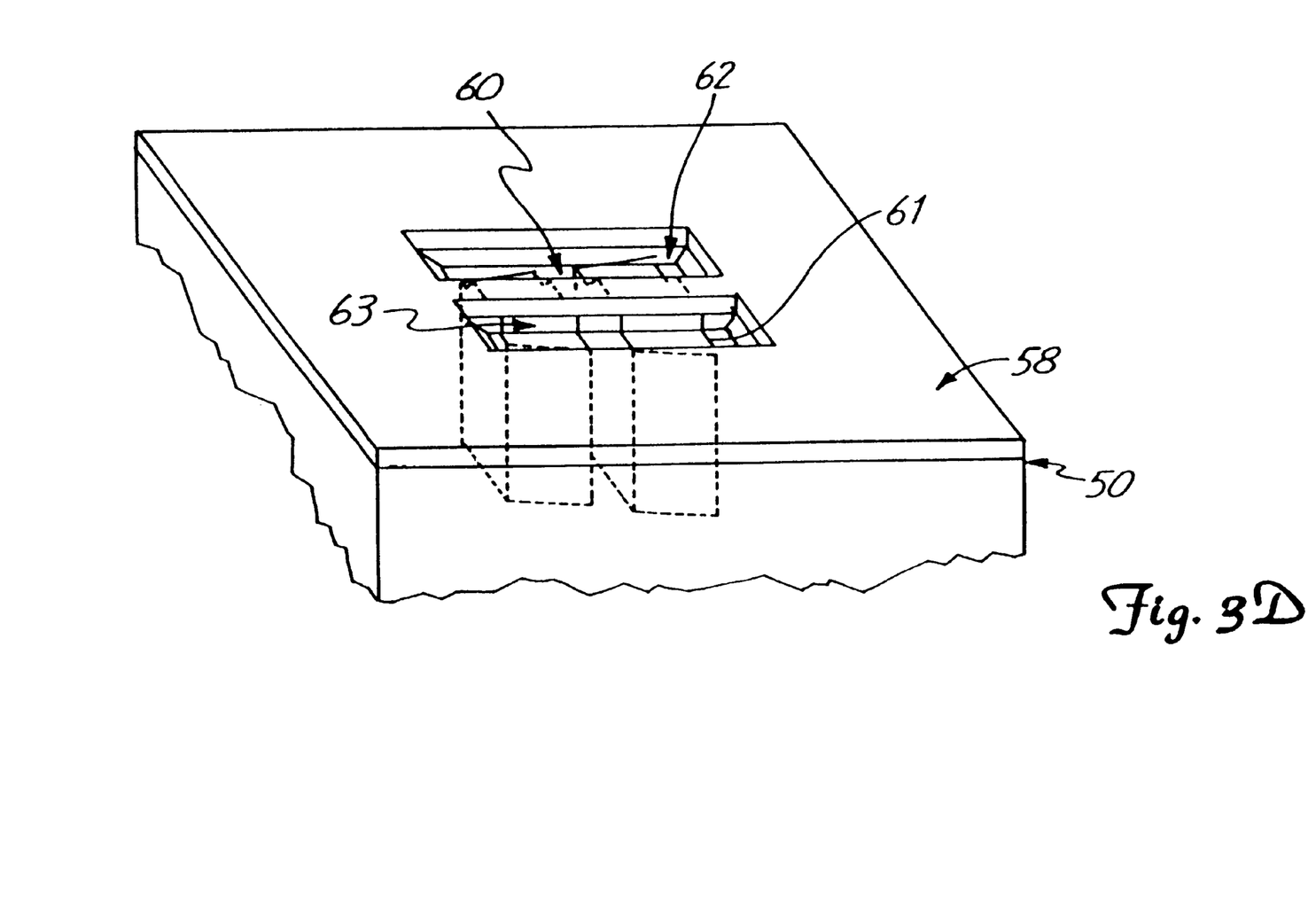

The pole tip reshaping process continues with the removal of head material near working surface 50 not covered by pole tip mask 58. This material may be removed to a selected depth through chemical etching or ion milling, both well known methods for removing material from thin-film heads. As shown in FIG. 3D, the removal of this material creates two depressions 60 and 61, each approximately 0.05 to 0.5 $\mu$m deep. Between depressions 60 and 61, and pole tip mask 58 are canted walls 62 and 63 respectively. Canted walls 62 and 63 are a result of limitations in the material removal process.

Figure 3E:
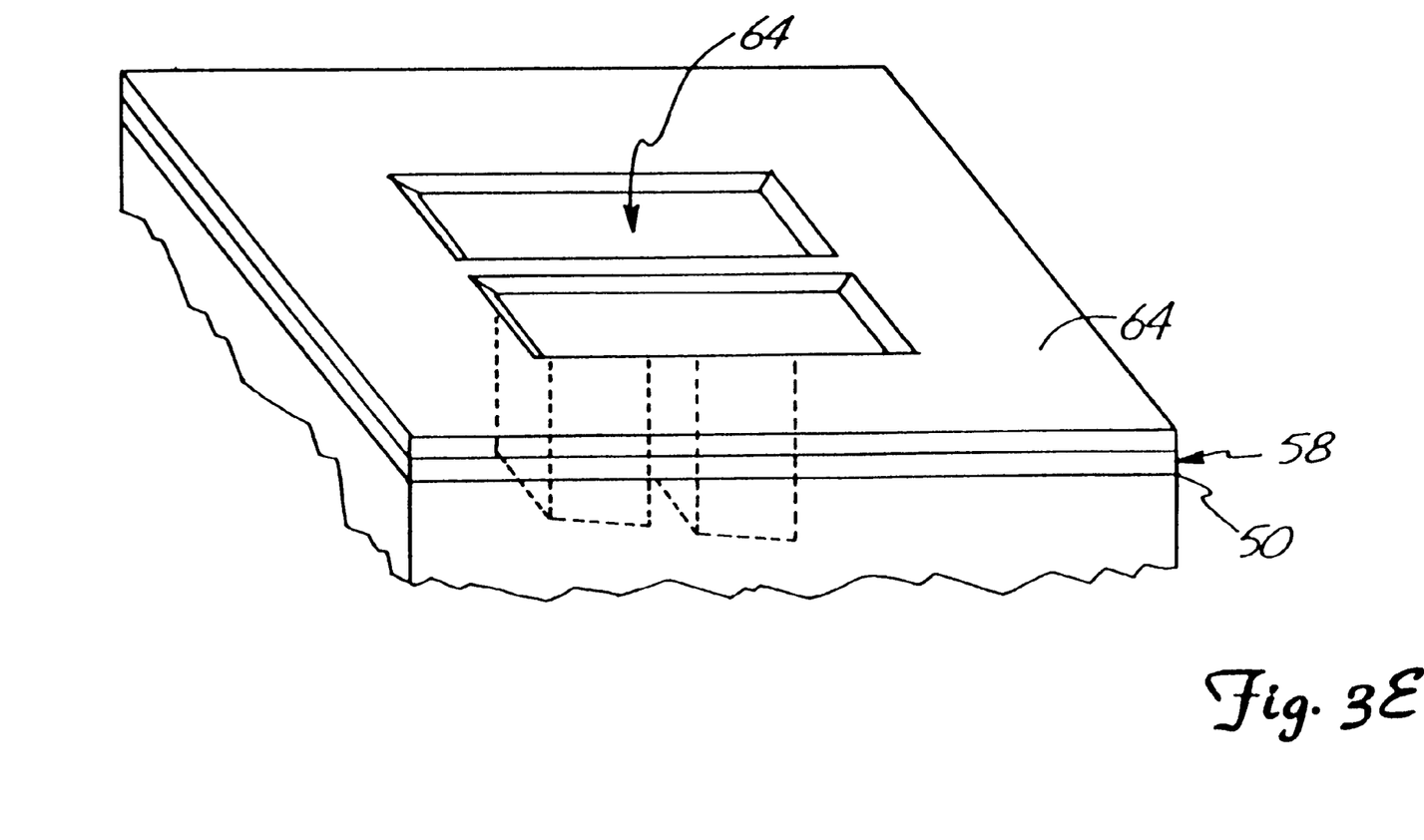

In one preferred embodiment, a fill material 64 is deposited in a well known manner over depressions 60 and 61, and pole tip mask 58, to fill depressions 60 and 64 as shown in FIG. 3E. Fill material 64 is deposited to a height such that the fill material covering depression 60 is the same height or higher than the remainder of working surface 50. Fill material 64 is preferably the same material, typically $Al_2O_3$, found in top insulating layer 52, gap 48 and bottom insulating layer 32. Having the same material in all of these areas is helpful in producing a level interface surface as discussed below.

After fill material 64 has been deposited, pole tip mask 58 is removed from the remainder of working surface 50. When pole tip mask 58 is removed, fill material 64 which covers this area fractures from the remaining portions of fill material 64 covering depressions 60 and 61. This leaves two areas of excess fill 66 and 67 as shown in FIG. 3F. With the removal of pole tip mask 58, shaped pole tips 68 are exposed.

Pole tip mask 58 may be removed using one of two methods. The first is a purely mechanical method in which the surface of fill material 64 is repeatedly struck to create fractures in the photoresist of pole tip mask 58. These fractures cause pole tip mask 58 to separate from the remaining portions of working surface 50. As discussed above, the removal of pole tip mask 58 causes the fill material covering this area to fracture from the remainder of the fill material.

The second method for removing the photoresist of pole tip mask 58 uses a laser to heat fill material 64 which, in turn, heats pole tip mask 58. When the photoresist material of pole tip mask 58 is heated, it crazes, forming minute cracks throughout. These minute cracks weaken the photoresist's bond to the remaining portions of working surface 50 and a low intensity mechanical process may be used to separate pole tip mask 58 from those remaining portions.

Figure 3G:
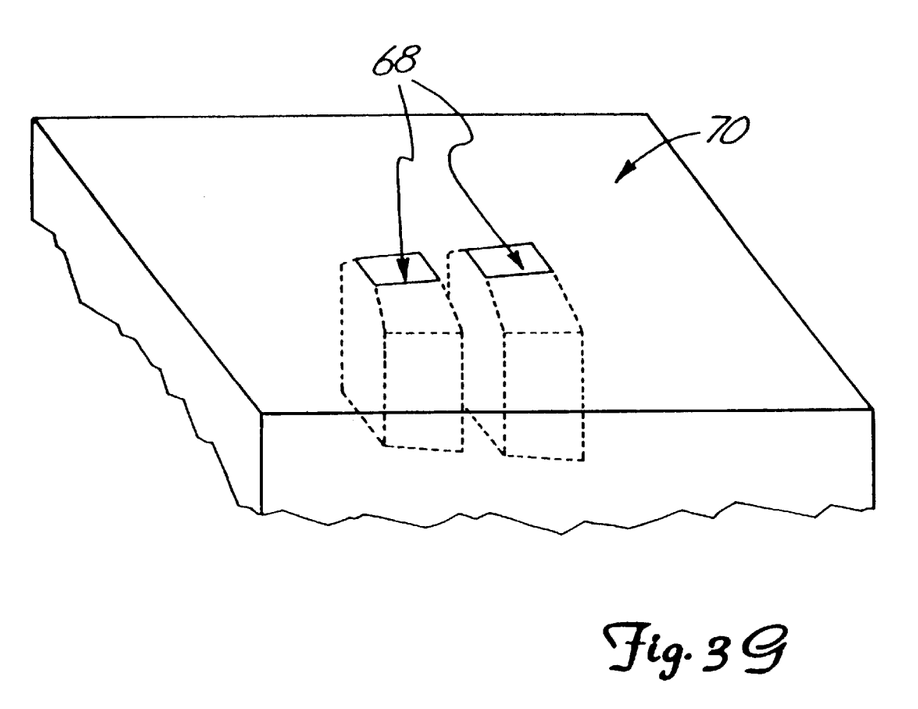

The final step to forming a smooth topography interface surface with patterned poles is the lapping of excess fill 66 and 67. Lapping consists of a controlled rubbing against an abrasive such as a diamond slurry. Since excess fill 66 and 67, top insulating layer 52, gap 48 and bottom insulating layer 32 are all preferably the same material, the lapping process erodes the material at the same rate in all four areas. This makes it much easier to produce a smooth topography interface surface 70 such as shown in FIG. 3G. After the lapping is completed, interface surface 70 is completely smooth.

Figure 4A:
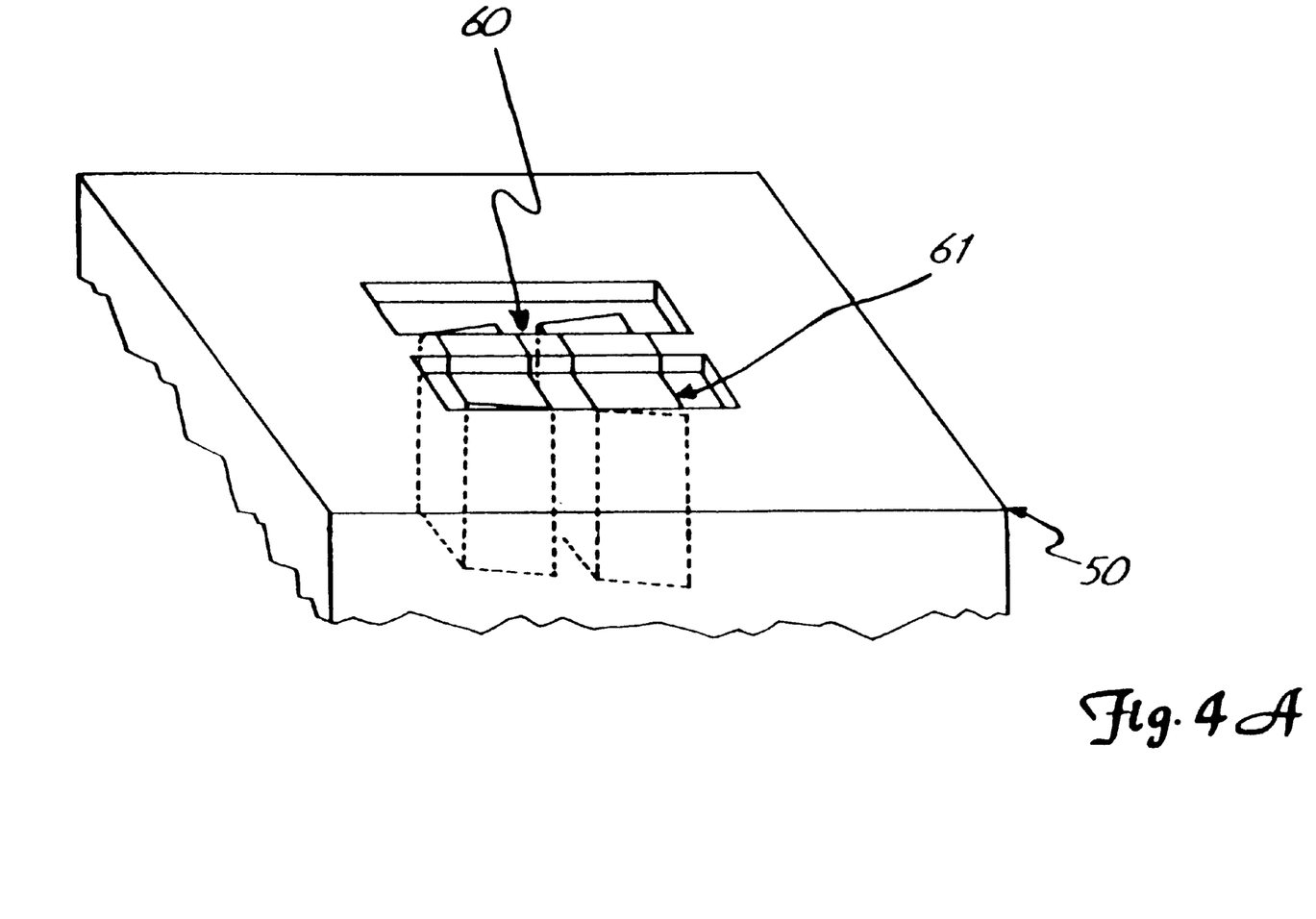
FIG. 4A is an isometric view of another embodiment of the present invention after depressions have been found by removing material from the working surface of FIG. 3A.
Figure 4B:
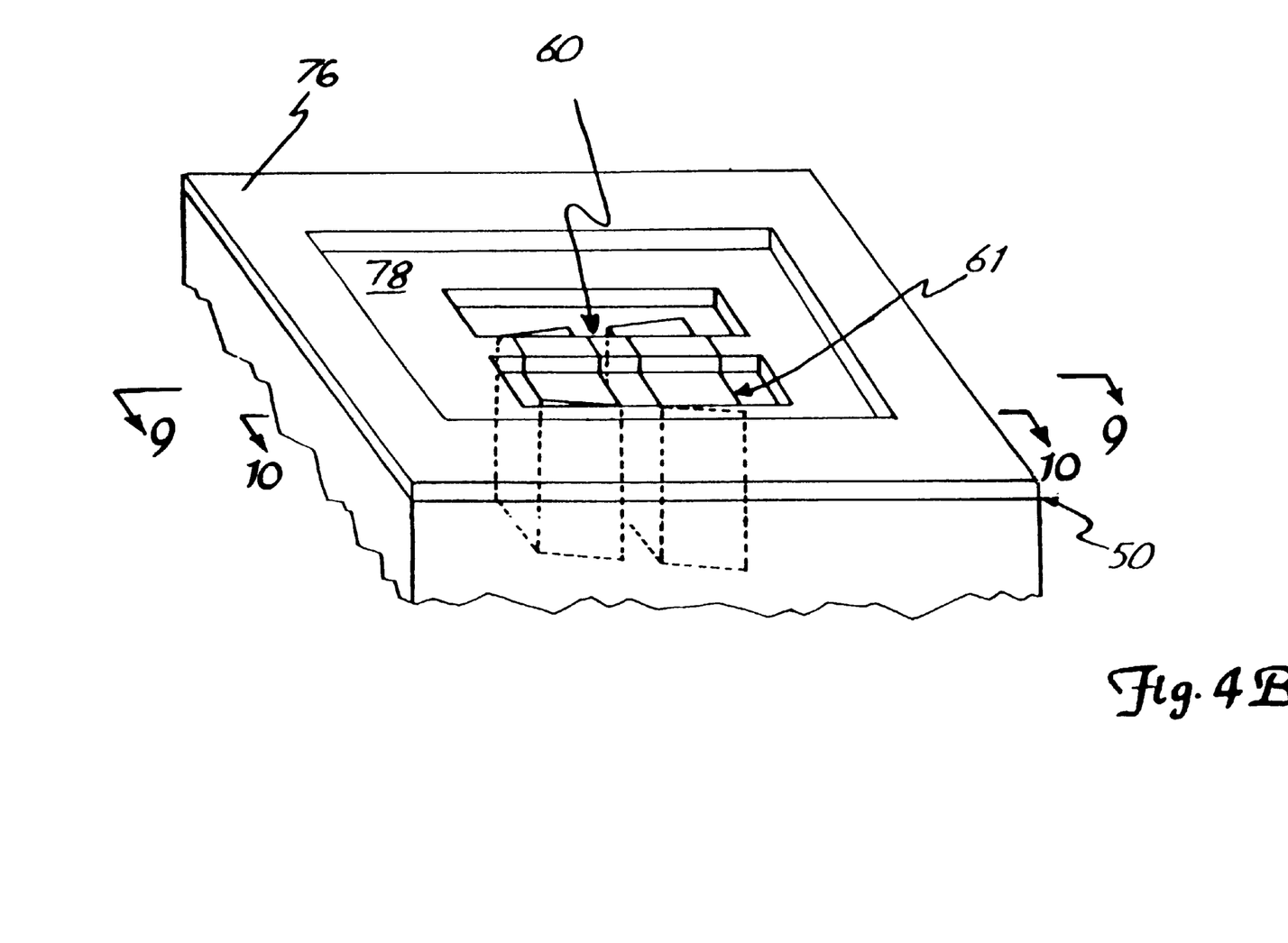
FIG. 4B is an isometric view of the embodiment of FIG. 4 after a mask has been applied.
Figure 5:
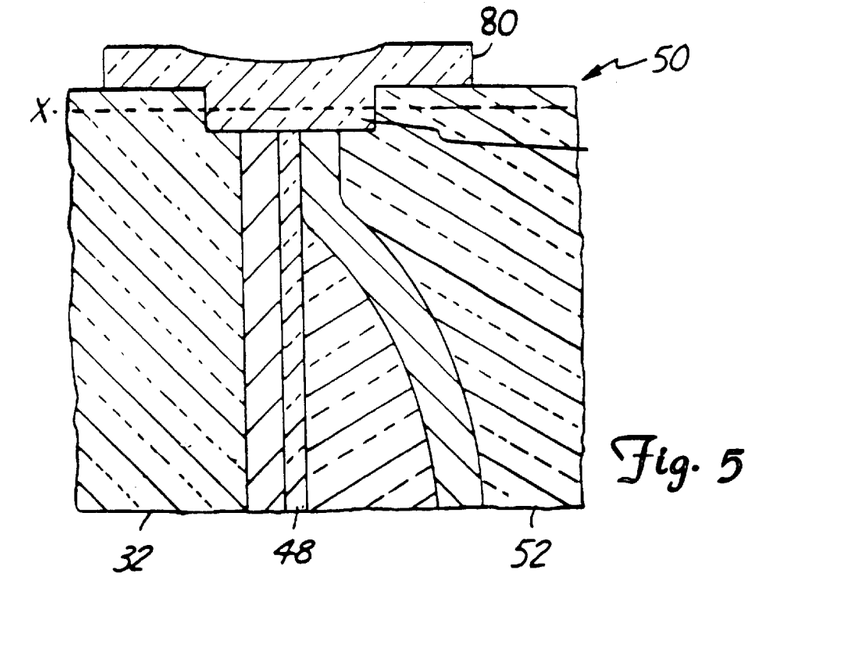
FIGS. 5 and 6 are section views taken at lines 9—9 and 10—10, respectively, in FIG. 4B after a fill material has been deposited and the mask removed.
Figure 6:
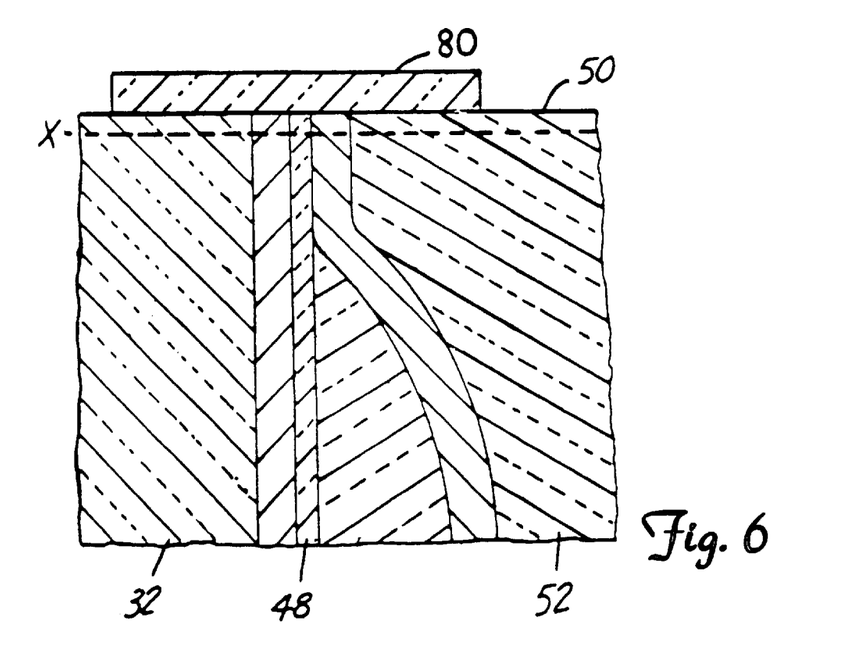

In other preferred embodiments, pole tip mask 58 is removed immediately after depressions 60 and 61 are formed. (FIG. 4A). A new mask 76 is then applied to surface 50 to form cavity 78 surrounding cavities 60 and 61. (FIG. 4B). Mask 76 may comprise a suitable negative photoresist that has been properly patterned through known development processes. For instance, mask 76 may be constructed from NFR012R photoresist available from Japan Synthetic Rubber Company, and patterned using photolithography. Next, and as shown in FIGS. 5 and 6, a filler material formed of suitable insulating material compatible to the insulating material forming bottom insulating layer 32, gap 48, and top insulating layer 52 is deposited onto mask 76 and to surface 50 and depressions 60 and 61 within cavity 78. As shown particularly in FIG. 5, filler layer 80 is formed over the portion of surface 50 exposed by mask 76, including cavities 60 and 61. The filler material is deposited to a depth at least as great, and preferably exceeding the depth of cavities 60 and 61.

Figure 7:
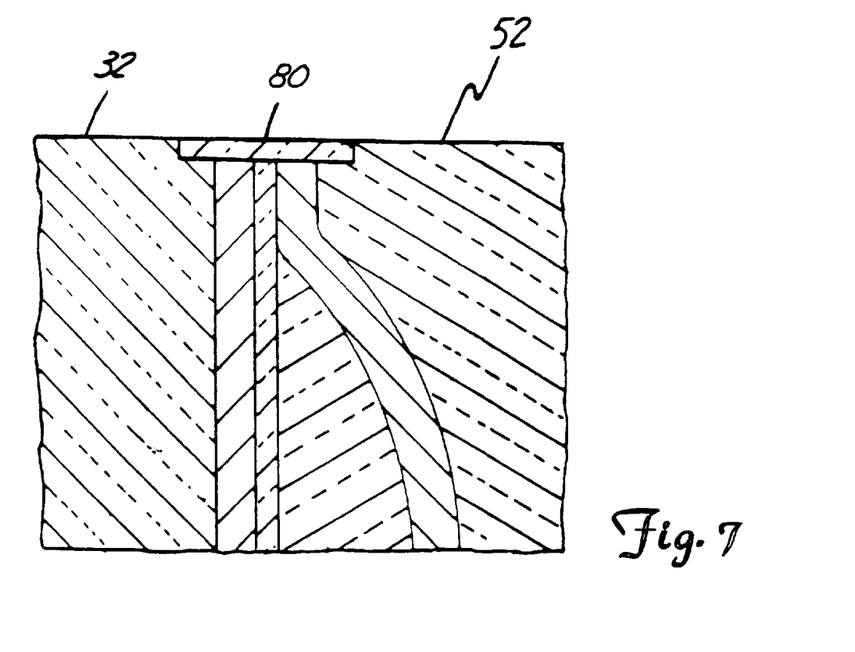
FIGS. 7 and 8 are section views, as in FIGS. 5 and 6, showing the lapping of the air bearing surface.
Figure 8:
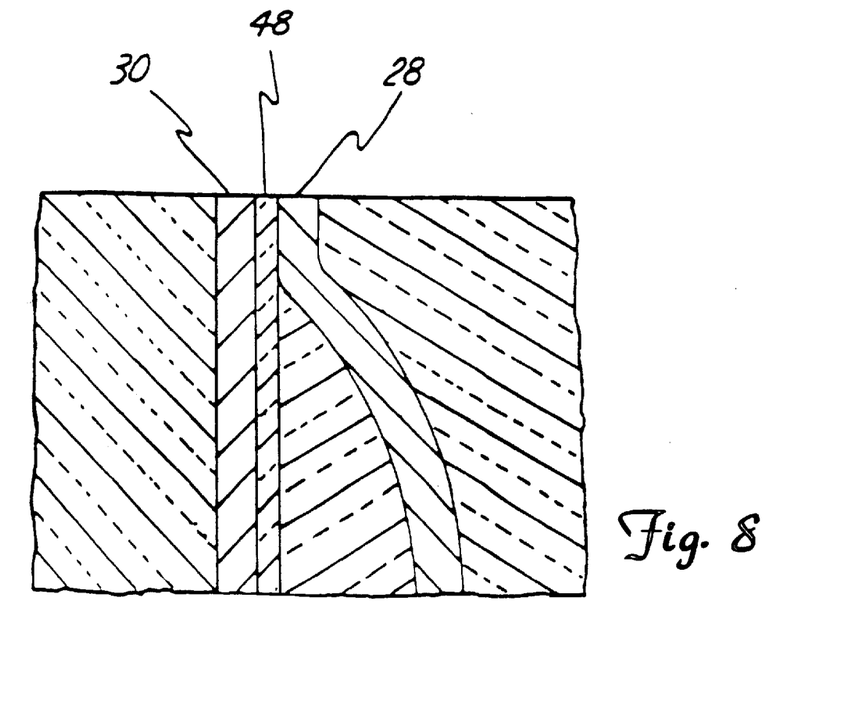

Next, and as shown particularly in FIGS. 7 and 8, the working surface 50 together with filler layer 80 is lapped and polished to an extremely flat, polished surface shown at X in FIGS. 5–8, to complete the air bearing surface of the head. As shown particularly in FIGS. 7–8, the filler material in cavity 61 now comprises a filler layer 80 that is lapped flush with pole tips 28 and 30 and gap material 48 at the air bearing surface X.

While it is not necessary that the area exposed by cavity 78 in mask 76 encompass both cavities 60 and 61, it is important that a portion of surface 50 surrounding each cavity 60 and 61 is exposed in cavity 78 in mask 76. Hence, while two cavities may be formed in mask 76, each surrounding a cavity 60 or 61, it is convenient to employ a single cavity 78 in mask 76 to surround both cavities 60 and 61. As a result, any voids formed in the deposit of the filler material are most likely at the edges of cavity 78, removed from cavities 60 and 61, so that during the lapping process, including lapping into surface 50 to form the air bearing surface, the effects of the voids in trapping debris during the lapping process, are removed with the voids.

While the filler material forming filler layer 80 is not required to be of the same material as insulating layers 32 and 52, the material chosen should have similar mechanical properties, such as thermal expansion coefficient, wear resistance and lapping rate, as insulating layers 32 and 52. Preferably, where layers 32 and 52 are formed of $Al_2O_3$, it is preferred that filler material 80 also be formed of $Al_2O_3$.

In the process of forming the filler material within mask 76, some filler material may be deposited on top of mask 76. That filler material is removed by a heating process, such as a laser beam, or other mechanical process. In either case, the bond of mask 76 to the insulating layers 32 and 52 is weakened or broken, at least on a localized scale, allowing the mask to be removed by a low intensity mechanical process. For example, photoresist of mask 76 may be wiped off with a soft cloth or Velcro pad. Filler material adhering to the photoresist of mask 76 is removed in this fashion, leaving only the filler material as illustrated in FIGS. 5 and 6.

While the present invention has been described in connection with the use of a photoresist, any type of mask material may be employed. Moreover, where a mask or photoresist is employed, etching may be accomplished by a fluid etch, or by ion beam removal process. As an alternative to the photolithography and etching process steps, the pole tips and surrounding insulator may be patterned through a focused ion beam removal process. This method would employ an ion beam having a very small spot size which is rastered through the predefined area to remove pole edges and insulation. For example, the ion beam would be controlled by a microprocessor, to etch the pole tips to selected pattern as described herein. Formation of the filler material, would, however, be substantially the same as described herein through the use of a mask and deposition of a filler.

One feature of the present invention resides in the fact that the shape of the area around the pole tips prior to etching may be varied to permit both linear and non-linear track width definition. This feature can improve electrical performance characteristics of the thin film head and reduce readback undershoots and side reading from fringing fields. For a greater discussion on shaping the pole tips to reduce undershoots and side reading, reference may be made to U.S. application Ser. No. 08/481,090 filed Jun. 7, 1995 for "Thin-Film Transducer Design for Undershoot Reduction" by Steven B. Slade et al. and assigned to the same assignee as the present application. Another feature of the present invention resides in the creation of a smooth air bearing surface within which the poles are patterned for track width definition without adversely affecting the smooth, planar surface of the air bearing surface. This greatly enhances the life of the head as well as its mechanical reliability by preventing the accumulation of foreign material.

Although the present invention has been described in connection with thin film inductive heads, it will be appreciated that the invention is equally useful to trim pole pieces at the air bearing surfaces of other types of inductive heads, as well as write elements of MR heads. Moreover, where a magnetic shield layer of a magnetoresistive read element of an MR head also serves as a pole of an inductive write element on the same head, the present invention may be used to trim the common shield/pole magnetic layer. Also, while the present invention has been described with reference to preferred embodiments, workers skilled in the art will recognize that changes may be made in form and detail without departing from the spirit and scope of the invention.

What is claimed is:

1. A method for producing thin-film head transducers, the method comprising:

depositing and etching materials on a wafer to create a plurality of partial thin-film heads;

cutting rows of partial thin-film heads from the wafer, the cut rows exposing working surfaces having pole tip surfaces;

rotating the thin-film heads so that the working surfaces are substantially in a common plane;

removing selected portions of each working surface to a selected depth to form exposed surfaces in the partial thin-film heads;

masking an area surrounding the exposed surfaces and portions of the working surface proximate the exposed surfaces;

depositing a fill material on the exposed surfaces; and removing portions of the fill material to form a smooth interface surface having pole tip surfaces.

2. The method of claim 1 further comprising masking the working surface before removing selected portions of the working surface, the masking creating masked areas covered by masking material and unmasked areas not covered by masking material, the unmasked areas defining the selected portions of the working surface removed to form the exposed surfaces, and removing the masking after the exposed surfaces are created.

* * * * *